3,729,511
N-PENTACHLOROPHENOXY-METHYL-N-HYDROCARBON-AMINES

Joseph W. Baker, Kirkwood, and Ignatius Schumacher, Webster Groves, Mo., assignors to Monsanto Company, St. Louis, Mo.
No Drawing. Filed July 13, 1970, Ser. No. 54,606
Int. Cl. C07c 93/06
U.S. Cl. 260—570.7                            5 Claims

ABSTRACT OF THE DISCLOSURE

Halophenoxymethylamines as new chemical compounds. These compounds have been found to be useful in the control of bacteria.

---

This invention relates to a novel class of organic chemical compounds. More particularly, this invention is concerned with novel halophenoxymethylamines. Such materials have been found to possess useful and unexpected biological activity.

The novel compounds of this invention have the formula

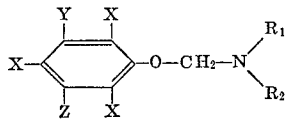

wherein

X is halogen,
Y and Z are hydrogen or halogen,
$R_1$ is alkyl, alkenyl, aryl, haloalkyl, hydroxyalkyl, cycloalkyl, cyanoalkyl, alkoxyalkyl or haloakenyl,
$R_2$ is hydrogen, alkyl, alkenyl, aryl, aralkyl, haloalkyl, hydroxyalkyl, cycloalkyl, cyanolkyl, alkoxyalkyl or haloalkenyl, and
$R_1$ and $R_2$ together with the adjacent nitrogen atom can form a heterocyclic ring, provided, however, that there are from one to about 20 carbon atoms in $R_1$ and $R_2$ and the halogen is selected from the group consisting of chlorine, bromine or iodine.

The novel halophenoxymethylamines of this invention can be readily prepared by reacting a halogenated phenol with formaldehyde and an appropriate amine. A typical reaction for forming these novel compounds is illustrated by the following equation:

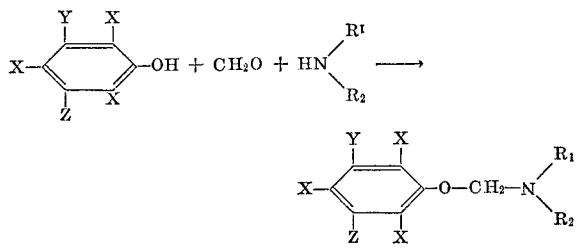

wherein X, Y, Z, $R_1$ and $R_2$ have the same meanings as defined hereinabove.

It is preferred to carry out the reaction in the presence of an inert organic solvent. Suitable solvents include benzene, toluene, xylene, the chlorinated benzenes, ethyl ether, propyl ether, tetrahydrofuran and the like. The reaction temperature employed in the preparation of the compounds of this invention will vary from room temperature to the reflux temperature of the reaction mixture. The specific temperature employed in any given preparation will be primarily dependent upon the particular reactants used therein. It should be noted that although the presence of an inert organic solvent is preferred, it is not essential to the preparation of the compounds described herein.

Halophenoxymethylamines exemplary of this invention include:

N-(pentachlorophenoxymethyl)-nonylamine
N-(pentabromophenoxymethyl)-ethylamine
N-(pentabromophenoxymethyl)-morpholine
N-(2,4,6-tribromo-3-chlorophenoxymethyl)-morpholine
N-(pentachlorophenoxymethyl)-morpholine
N-(2,4,6-trichloro-3-bromophenoxymethyl)-morpholine
N-(2,4,6-trichlorophenoxymethyl)-decylamine
N-(2,4,6-trichloro-3-bromophenoxymethyl)-decylamine
N-(2,4,6-tribromophenoxymethyl)-bis(2-chloroethyl) amine
N-(2,4,6-trichloro-3,5-dibromophenoxymethyl)-bis(2-chloroethyl)amine
N-(pentachlorophenoxymethyl)-N-methyl-octylamine
N-(2,3,4,6-tetrachlorophenoxymethyl)-cyclohexylamine
N-(2,3,4,6-tetrabromophenoxymethyl)-octadecylamine
N-(pentachlorophenoxymethyl)-octadecylamine
N-(pentaiodophenoxymethyl)-octadecylamine
N-(2,4,6-iodophenoxymethyl)-morpholine
N-(2,4,6-iodo-3,5-chlorophenoxymethyl)-morpholine
N-(pentachlorophenoxymethyl)-N,N-dicyclohexylamine
N-(2,4,6-trichlorophenoxymethyl)-cyanopropylamine
N-(pentachlorophenoxymethyl)-phenylamine
N-(pentachlorophenoxymethyl)-2-hydroxyethylamine
N-(pentachlorophenoxymethyl)-2-methoxyethylamine
N-(pentachlorophenoxymethyl)-N,N-diallylamine
N-(pentachlorophenoxymethyl)-N-(p-dodecylphenyl) amine
N-(pentachlorophenoxymethyl)-pyrrolidine
N-(pentachlorophenoxymethyl)-N,N-diheptylamine
N-(pentachlorophenoxymethyl)-piperidine
N-(pentachlorophenoxymethyl)-N,N-dipropylamine
N-(2,4,6-trichlorophenoxymethyl)-morpholine
N-(2,4,6-trichlorophenoxymethyl)-piperidine.

The invention wil be more fully understood by reference to the following examples which are set forth herein for the purpose of illustration only and which are not to be construed as limiting the scope of this invention in any manner.

EXAMPLE 1

N-(pentachlorophenoxymethyl)-nonylamine

A suitable reaction vessel is charged with a 10 ml. tetrahydrofuran solution containing 2.8 grams of nonylamine (0.02 mole) and is maintained at a temperature of about 15 to 20° C. 0.025 mole of formaldehyde is diluted with water to 10 ml. and added to the reaction vessel. The resulting mass is allowed to come to room temperature and held there for about ½ hour. To this was added a 30 ml. solution of 5.3 grams (0.02 mole) of pentachlorophenol dissolved in tetrahydrofuran. After holding this mass at 20° for 2 hours and allowing it to sit at room temperature for 12 hours the solvent was evaporated. The residue is a very heavy oil weighing 8.3 grams and upon analysis shows 42.2% of chlorine as against a calculated value of 42.2% chlorine and 3.2% nitrogen as against a calculated value of 3.64 for nitrogen for N-(pentachlorophenoxymethyl)-nonylamine.

EXAMPLE 2

N-(pentachlorophenoxymethyl)-morpholine

Following the detailed procedure set forth in Example 1, the reactants employed are 8.7 grams (0.1 mole) of morpholine, 26.6 grams of pentachlorophenol (0.1 mole) and 10 ml. of an aqueous solution containing 0.125 moles of formaldehyde. The product obtained is N-(pentachlorophenoxymethyl)-morpholine which is an off-white solid with a melting point of 105 to 110° C.

EXAMPLE 3

N-(pentachlorophenoxymethyl)-N-methyl-octylamine

Following the detailed procedure set forth in Example 1, the reactants employed are 2.8 grams (0.02 mole) of octylamine, 5.3 grams (0.02 mole) of pentachlorophenol and 2 ml. of an aqueous solution containing 0.025 mole of formaldehyde product obtained is N-(pentachlorophenoxymethyl)-N-methyloctylamine which is a whitish solid which turns pink on heating, softens at 50° C. and melts completely at 65° C.

EXAMPLE 4

N-(pentachlorophenoxymethyl)-octadecylamine

Following the detailed procedure set forth in Example 1, the reactants employed are 14 grams (0.05 mole) octadecylamine, 13.3 grams (0.05 mole) of pentachlorophenol and 5 ml. of an aqueous solution containing 0.062 mole of formaldehyde. The product obtained is N-(pentachlorophenoxymethyl)-octadecylamine which is confirmed by IR spectra analysis.

EXAMPLE 5

N-(pentachlorophenoxymethyl)-N,N-dicyclohexylamine

Following the detailed procedure set forth in Example 1, the reactants employed are 8.5 grams (0.05 mole) dicyclohexylamine, 13.3 grams (0.05 mole) of pentachlorophenol and 5 ml. of an aqueous solution containing 0.062 mole of formaldehyde. The product obtained is N-(pentachlorophenoxymethyl)-N,N-dicyclohexylamine which is a white solid which has a melting point of 215 to 220° and forms a clear colorless melt.

EXAMPLE 6

N-(pentachlorophenoxymethyl)-N,N-diallylamine

Following the detailed procedure set forth in Example 1, the reactants employed are 5.3 grams (0.02 mole) of pentachlorophenol, 0.025 mole of formaldehyde and 1.95 grams (0.02 mole) of diallylamine. The product obtained is N - (pentachlorophenoxymethyl) - N,N-diallylamine which has a melting point of 113–115° C.

EXAMPLE 7

N-(pentachlorophenoxymethyl)-N-(p-dodecylphenyl)-amine

Following the detailed procedure set forth in Example 1, the reactants employed are 5.2 grams (0.02 mole) of p-dodecylanaline, 5.3 grams (0.02 mole) of pentachlorophenol and 2 ml. of an aqueous solution containing 0.025 mole of formaldehyde. The product obtained is N(pentachlorophenoxymethyl) - N - (p-dodecylphenyl)-amine which is a product that has a slightly reddish appearance.

EXAMPLE 8

N-(2,4,6-trichlorophenoxymethyl)-morpholine

Following the detailed procedure set forth in Example 1, the reactants employed are 0.02 mole of 2,4,6-trichlorophenol, 0.02 mole of morpholine and 0.025 mole of formaldehyde. The product obtained is N-(2,4,6-trichlorophenoxymethyl)-morpholine.

EXAMPLE 9

N-(2,4,6-tribromo-5-chlorophenoxymethyl)-decylamine

Following the detailed procedure set forth in Example 1, the reactants employed are 0.02 mole of 2,4,6-tribrimo-5-chlorophenol, 0.02 mole decylamine and 0.025 mole of formaldehyde. The product obtained is N-(2,4,6-tribromo-5-chlorophenoxymethyl)-decylamine.

EXAMPLE 10

N-(2,4,6-trichloro-3,5-dibromophenoxymethyl)-bis(2-chloroethyl)amine

Following the detailed procedure set forth in Example 1, the reactants employed are 0.1 mole of 2,4,6-trichloro-3,5-dibromophenol, 0.1 mole bis(2-chloroethyl)amine and 0.125 mole of formaldehyde. The product obtained is N - (2,4,6 - trichloro-3,5-dibromophenoxymethyl)-bis-(2-chloroethyl)amine.

EXAMPLE 11

N-(2,3,4,6-tetrachlorophenoxymethyl)-cyclohexylamine

Following the detailed procedure set forth in Example 1, the reactants employed are 0.05 mole of 2,3,4,6-tetrachlorophenol, 0.05 mole of cyclohexylamine and 0.062 mole of formaldehyde. The product obtained is N-(2,3,4,6-tetrachlorophenoxymethyl)-cyclohexylamine.

As stated above, the products of the present invention are useful as microbiocides adapted to be employed for the control of gram positive bacterial organisms. In representative serial dilution tests the compounds prepared in the above Examples 1 through 7 were found to be effective against bacteria at dilution levels shown in Table I. (S. a.=Staphylococcus aureus, S. t.=Salmonella typhosa, Ps. a.=Pseudomonas aeruginosa, A. n.=Aspergillus niger.)

TABLE I

| Compound of Example | Highest dilution for bacteria control (parts per) | | | |
|---|---|---|---|---|
| | S. a. | S. t. | Ps. a. | A. n. |
| 1 | $10^6$ | $10^4$ | $10^3$ | $10^5$ |
| 2 | $10^6$ | $10^4$ | $10^3$ | $10^5$ |
| 3 | $10^6$ | $10^4$ | $10^3$ | $10^5$ |
| 4 | $10^6$ | $10^3$ | $10^3$ | $10^4$ |
| 5 | $10^6$ | $10^3$ | $10^3$ | $10^5$ |
| 6 | $10^6$ | $10^3$ | $10^3$ | $10^5$ |
| 7 | $10^6$ | $10^3$ | $10^3$ | $10^4$ |

Similar activity is displayed by other and different halophenoxymethyl amines of this invention.

Relatively small amounts of these halophenoxymethyl amines in a detergent soap composition have been found to yield effective antiseptic detergent soap compositions. Amounts as low as 0.5 to 1% by weight based upon the weight of the detergent soap have proved satisfactory in some instances. However, it is preferred to employ these halophenoxymethylamines in amounts in the order of 1 to 3% by weight based on the detergent soap. While larger amounts may be employed, as for example, up to 10% by weight the upper limit will be determined by practical considerations. Various colors, antioxidants, perfumes, water softeners, emollients, and the like may be included where desirable in detergent soap compositions containing the new halophenoxymethylamines. The term "soap" or "detergent soap" as used herein is employed in its popular or ordinary sense, i.e. those cleansing compositions prepared from an alkali metal compound such as potassium or sodium hydroxide and a fat or fatty acid, both saturated and unsaturated.

The halophenoxymethyl amines of this invention have also displayed activity as herbicides and fungicides.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. N-(pentachlorophenoxymethyl)-nonylamine.
2. N - (pentachlorophenoxymethyl) - N - methyl-octylamine.
3. N - (pentachlorophenoxymethyl) - octadecylamine.
4. N - (pentachlorophenoxymethyl) - N,N - dicyclohexylamine.
5. N - (pentachlorophenoxymethyl) - N - (p-dodecylphenyl) amine.

References Cited

UNITED STATES PATENTS

| | | | |
|---|---|---|---|
| 3,142,554 | 7/1964 | Godfrey | 260—570.7 |
| 3,221,054 | 11/1965 | Arnold et al. | 260—570.7 |
| 3,567,723 | 3/1971 | Seki et al. | 260—570.7 |

ALEX MAZEL, Primary Examiner

J. TOVAR, Assistant Examiner

U.S. Cl. X.R.

260—247.7 C, 293.78, 326.5 L, 465 E; 424—330